United States Patent
Dieruf

(10) Patent No.: US 9,684,832 B2
(45) Date of Patent: Jun. 20, 2017

(54) METHODS AND SYSTEMS FOR PROVIDING REMOTE PLANT IDENTIFICATION BY UNIQUE BIOLOGICAL CHARACTERISTICS

(71) Applicant: Jerry Dieruf, Springfield, VA (US)

(72) Inventor: Jerry Dieruf, Springfield, VA (US)

(*) Notice: Subject to any disclaimer, the term of this patent is extended or adjusted under 35 U.S.C. 154(b) by 154 days.

(21) Appl. No.: 14/074,705

(22) Filed: Nov. 7, 2013

(65) Prior Publication Data
US 2014/0140581 A1    May 22, 2014

Related U.S. Application Data

(60) Provisional application No. 61/796,305, filed on Nov. 7, 2012.

(51) Int. Cl.
*G06K 9/00* (2006.01)
*G06K 9/46* (2006.01)

(52) U.S. Cl.
CPC ....... *G06K 9/00657* (2013.01); *G06K 9/4652* (2013.01)

(58) Field of Classification Search
None
See application file for complete search history.

(56) References Cited

U.S. PATENT DOCUMENTS

| 5,764,819 A * | 6/1998 | Orr ........................... A01G 7/00 348/144 |
| 2006/0039603 A1* | 2/2006 | Koutsky ............ G06K 9/00147 382/165 |
| 2007/0043527 A1* | 2/2007 | Quan ...................... G06T 7/408 702/104 |
| 2012/0114185 A1* | 5/2012 | Ram et al. .................... 382/110 |
| 2012/0169498 A1* | 7/2012 | Leppanen et al. ............ 340/540 |
| 2013/0235183 A1* | 9/2013 | Redden ........................... 348/89 |

OTHER PUBLICATIONS

Hartmann, Hudson T., Kester, Dale E; "Plant Propagation Principles and Practices"; Third Edition, Prentice-Hall, Inc.; Englewood Cliffs, NJ; p. 13.

* cited by examiner

*Primary Examiner* — Weiwen Yang
(74) *Attorney, Agent, or Firm* — Capitol Patent & Trademark Law Firm, PLLC; John Curtin

(57) ABSTRACT

Plants may be remotely identified using unique biological characteristics (UBCs). One method involves determining a target plant within an area to be surveyed and associated target plant characteristics. The method may further include a determination of one or more unique UBCs associated with the target plant, and the location of a training plant within the physical area that exhibits the target plant characteristics. Thereafter, comparisons may be made between subsections of an acquired, date-specific, geo referenced image and data representing the training plant to identify those subsections that represent plants within the area that are associated with the one or more UBCs.

16 Claims, 18 Drawing Sheets

Urban Forest

Urban Forest

Date Specific

Target Plant

Unique Biological Characteristic 6 (green trees)

7

Fall Color Unique Biological Characteristic

Training Plant

Locate Training Plant

Pixelated Training Plant

The Pixel of The Unique Biological Characteristic

The Search Result

Overlay Clusters on Aerial Image

Field Review of Search Result

Remote Plant Identification by Unique Biological Characteristics

Remote Plant Identification by Unique Biological Characteristics

METHODS AND SYSTEMS FOR PROVIDING REMOTE PLANT IDENTIFICATION BY UNIQUE BIOLOGICAL CHARACTERISTICS

RELATED APPLICATION

This application claims the benefit of priority from U.S. Provisional Application No. 61/796,305 filed Nov. 7, 2012, the contents and context of which, including, but not limited to the text and figures therein, are incorporated by reference in full herein as if set forth in full herein, and further incorporates by reference in full herein, as if set forth in full herein, the contents of U.S. application Ser. No. 14/074,711 filed on Nov. 7, 2013.

INTRODUCTION

Historically, urban tree identification has been preformed manually by a trained specialist. The remote identification of plants has value to practitioners working with natural and urban forests. Urban forests differ from natural forests in many ways.

It is desirable to provide a horticultural approach for the remote identification of individual plants from digitalized aerial images. It is further desirable to provide an approach for remotely identifying plants that relies on a different approach than existing approaches, for example, an approach that relies on horticultural features like the digital color and texture of flowers, fruit, and foliage as they contrast to the surrounding urban forest. It is yet further desirable to provide an approach that takes advantage of the biological consistency of ornamental plants in the urban forest, and may use existing roads and building as reference points to an individual plant.

SUMMARY

The present invention includes embodiments directed at the desirable approaches mentioned above.

DETAILED DESCRIPTION, INCLUDING EXAMPLES

Figure 17A:
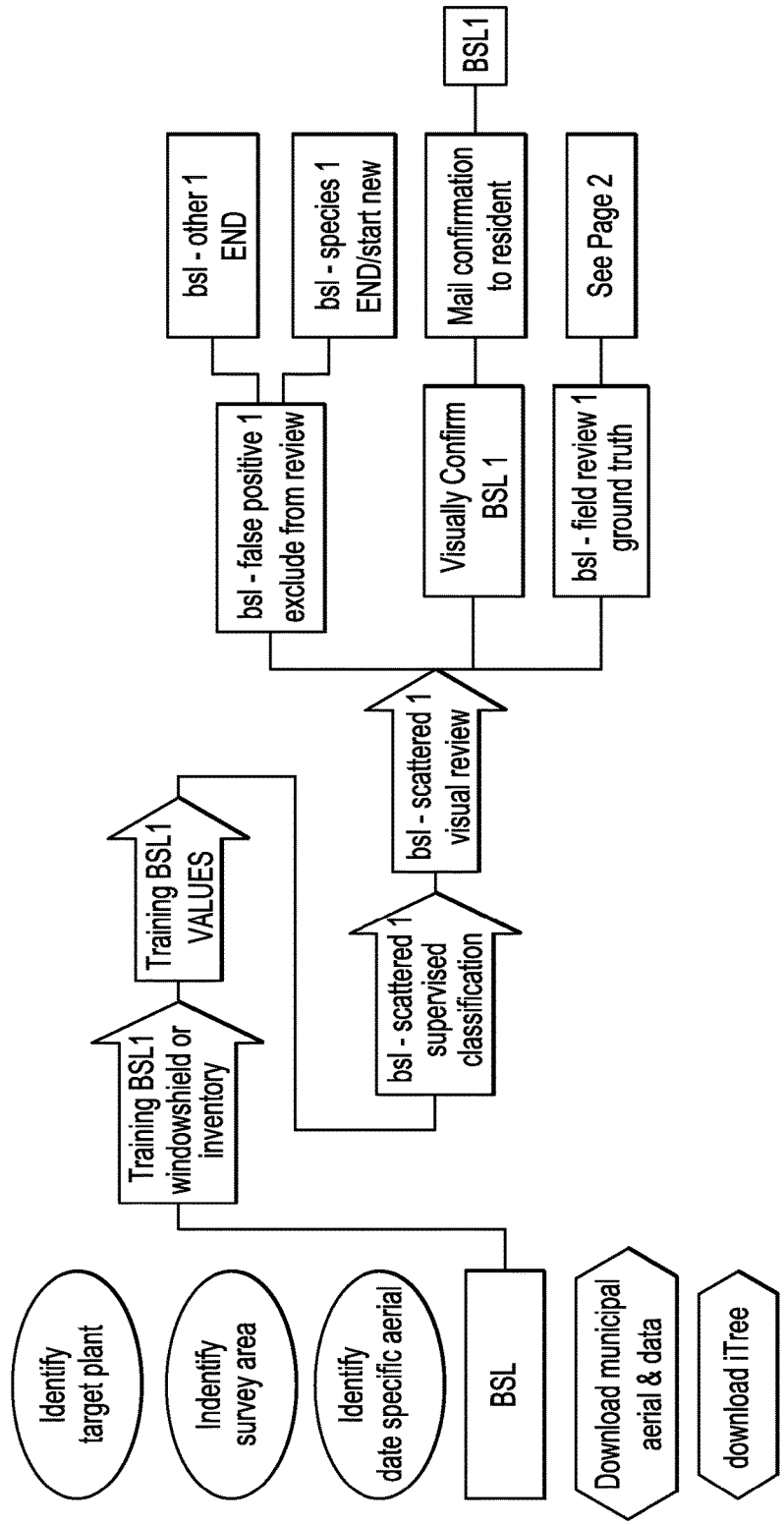
FIGS. 17*a* and *b* depict a flow diagram of exemplary methods according to embodiments of the invention.
Figure 17B:
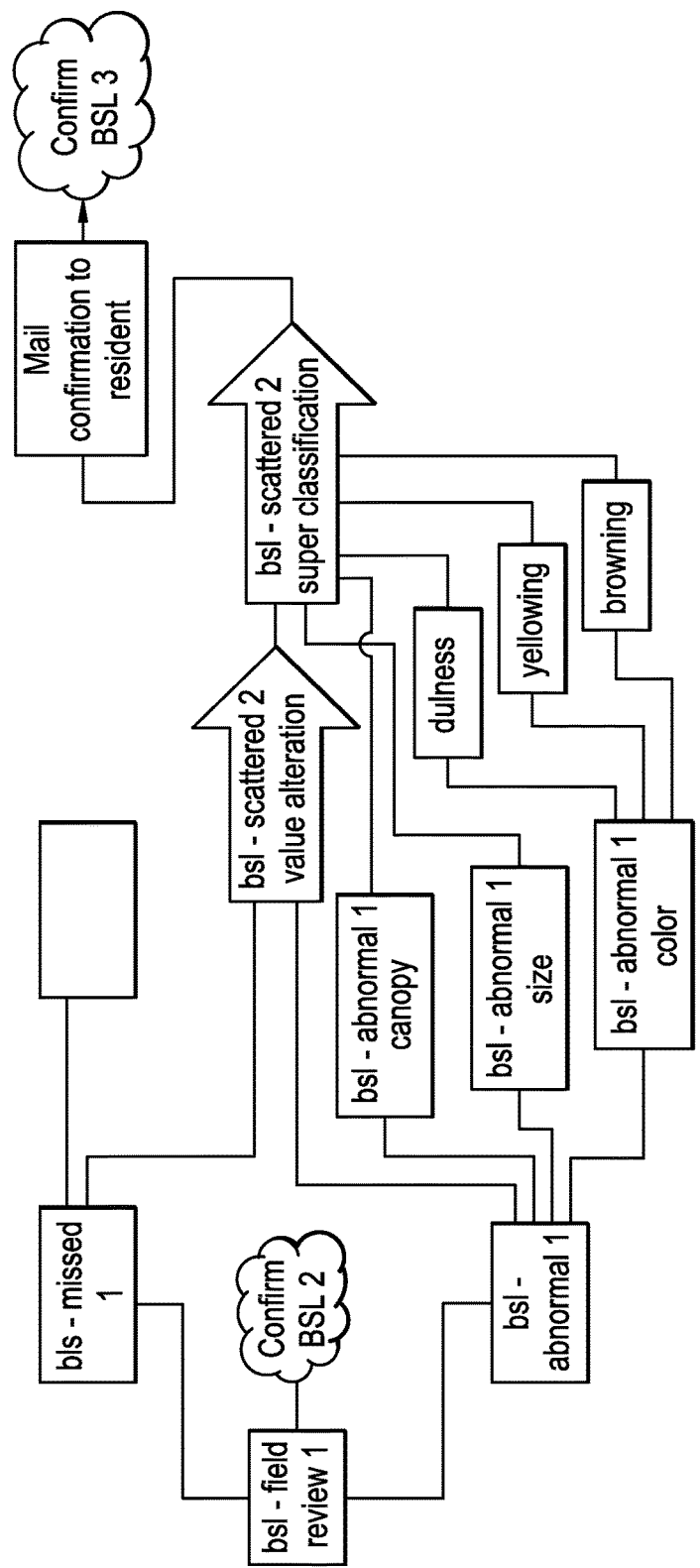

One embodiment of the invention may comprise a process or method (each word may be used interchangeably herein unless the context indicates otherwise) for identifying plants from remote images by unique biological characteristics (UBC). FIGS. 17*a* and 17*b* illustrate one or more of such methods.

In one embodiment, a particular method may comprise one or more of the following steps though not necessarily in the order that follows: (1) determining a physical area to be surveyed; (2) determining a "target" plant (i.e., plant type) and associated target plant characteristics; (3) determining one or more UBCs associated with the target plant (e.g., color and/or texture); (4) acquiring or otherwise creating images by, for example, using an aerial platform; (5) generating date-specific, geo referenced images from the acquired images; (6) locating individual plants from among the potential plants making up the available, determined target plants to locate a training plant within the physical area that exhibits the target plant characteristics; (7) evaluating each located plant as a potential "training" plant based on the desired, target plant; (8) comparing subsections of the image with data representing the training plant to identify those subsections that represent plants within the area that are associated with the one or more UBCs; (9) testing the results by cluster, object, and field reviews; and (10) applying quality control through user and relational based classification, and validation.

Collectively, these steps may be referred to as "surveying" or developing a "survey". As used herein the phrase "plant" means a living organism that is distinguished from an "animal". Some examples of a plant are flowers, bushes, trees and the like to name just a few examples.

Further, when used herein the phrase "target" is synonymous with the meaning of the phrase "type" unless the context clearly indicates otherwise. Still further, when used herein the phrase "texture" refers to the characteristics (e.g., shape) of a plant (or plant part, leaf shape) that are detectable by analyzing a digital representation of a plant's image unless the context clearly indicates otherwise. Each of the steps described above will be discussed in more detail in the following paragraphs in conjunction with the accompanying figures.

Figure 1:
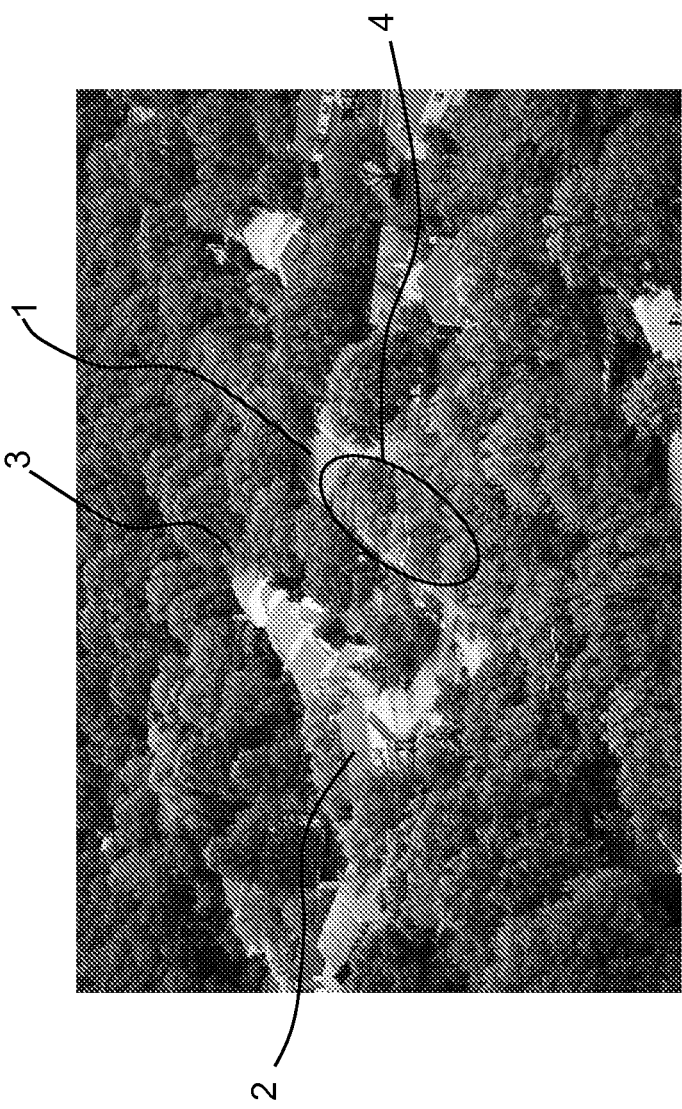
FIG. 1 depicts an image associated with an exemplary, physical area (or section of such an area) that may be surveyed according to an embodiment of the present invention.

FIG. 1 depicts an image associated with an exemplary, physical area (or section of such an area) that may be surveyed according to an embodiment of the present invention. For an exemplary physical area to be surveyed a survey location must first be identified. The survey location may usually be defined by property lines or jurisdictional boundaries, for example. The area may be any geographic location with physical objects present which relates to the surveyed plant. Urban and suburban areas, such as the exemplary image depicted in FIG. 1 with many manmade objects (streets and houses) offer good reference points. Urban areas provide advantageous reference points. For example, an urban area (e.g., the area in FIG. 1) typical includes small divisions formed by roads and/or property lines. Further, an urban area may include: (i) individual trees that are easier to see and define between roads, and within a small urban property; (ii) trees that are often planted in patterns, which provides more space to define and identify an individual tree. Yet further, an urban area may be easier to ground test (e.g., a test is to confirm, observe, or test the physical properties of a digital representation) with individual addresses to guide the field location of individual plants.

Urban areas due present some challenges. For example, buildings in an urban area may include large buildings that may shade trees from view. One exemplary, defined area studied by the present inventor was the city of Alexandria, Va.

The next step in an exemplary method for identifying plants from remote images by unique biological characteristics involves the determination of a target, or type, of plant, and associated target plant characteristics (e.g., characteristics of a healthy plant, or characteristics of an unhealthy plant) plant. Again, it should be understood that this step may or may not, procede the above-described step.

Figure 3:
FIG. 3 depicts an image of an exemplary, colored plant type or "target" plant according to an embodiment of the present invention.

A target plant should be selected from a plant type in the identified, specific physical area to be surveyed. Said another way, if a target plant is not within the area to be surveyed it will not be identified within the area, and, thus, the results of a given survey may be unsuccessful. FIG. 3 depicts an image of an exemplary, colored target plant according to an embodiment of the present invention. In the embodiment of FIG. 3 the plant type is a blue spruce (*Picea pungens*). In illustrative embodiments, a target plant may be selected from at least the group consisting of a genus, species, cultivar, or common name.

As is recognized by those skilled in the art, many cultivars of a species may be very difficult to distinguish or identify because they are associated with similar UBCs (e.g., color, texture) most of the time (e.g., throughout a calendar year). Thus, when a survey is directed at such a plant the timing of the survey may become important. For example, during some part of the calendar year, cultivars with similar UBCs may become temporarily dissimilar. Thus, during the time period when the UBCs are dissimilar it should be possible to visibly discern one species from another. For example, Aristocrat pear (*Pyrus calleryana* 'Aristocrat') and Bradford (*Pyrus calleryana* 'Bradford') are very hard to tell apart most of the time. However, the two pear trees have different flowering dates that can help to distinguish them. Another example are the cultivars of some red maple trees. It is often difficult to distinguish the Red Sunset red maple (*Acer rubrum* 'Red Sunset') from the October Glory red maple (*Acer rubrum* 'October Glory'), except during the Fall when the two red maples display their colors, but at different times during the Fall (e.g., weeks apart).

Some plants in an urban forest will cross breed. Cross-breeding results in many variations of the parent plant. The variations may be so small, or too large that they are hard to detect. This may occur most often with native plants that are preserved. The red oak species (*Quercus*) is an example of cross breeding.

In an illustrative embodiment, if an ornamental plant is to be used as a target plant then the specific target may be associated with a cultivar or species of the ornamental plant. If a native plant is to be used as a target plant, then the specific target may be associated with a species of the native plant.

For example, if a red maple is selected as a target plant, it has a 100% red maple gene. However, if a red oak is selected as a target plant, oaks cross-pollinate. Accordingly, a chestnut/post oak will be 50% chestnut oak and 50% post oak. Oak forests are not a monoculture of oak trees; they are a polyculture of many oak varieties of both the red and white oak species. This difference affects the ultimate color or texture (i.e., UBC) of a plant, and, therefore, the ability to accurately discern one plant type from another using such a UBC in a given area. Said another way, the more consistent the gene makeup of a potential target plant, the more consistent a given UBC associated with such a plant will occur within a geographic area to be surveyed.

From the discussion above it may be evident that the selection of a target plant is related to the particular UBC(s) of such a plant. That is to say, if it is desirable to conduct a survey of a given type of plant, such a survey should consider the time of year that the plant creates a discernible color or texture; in other words a discernible UBC.

Accordingly, the determination of which UBCs to use to identify plants within a given survey area is also related to the time of year or conditions under which a particular UBC(s) is discernible through the acquisition or creation of images of such plants, or visible inspection of such pants, within the survey area.

As explained above, in accordance with embodiments of the invention, it is desirable to determine and select UBCs (e.g., color or texture) for a target plant that are visible on a particular date or during a particular time period. For example, a UBC may be a specific color of a flowering plant and/or the digital texture of such a plant as seen on an (aerial) image at the time of full bloom, as is the case with the Bradford pears (*Pyrus calleryana* 'Bradford') and Yoshino cherry trees (*Prunus yedoensis*).

Figure 4:
FIG. 4 depicts an exemplary image used to illustrate a UBC according to an embodiment of the invention.
Figure 5:
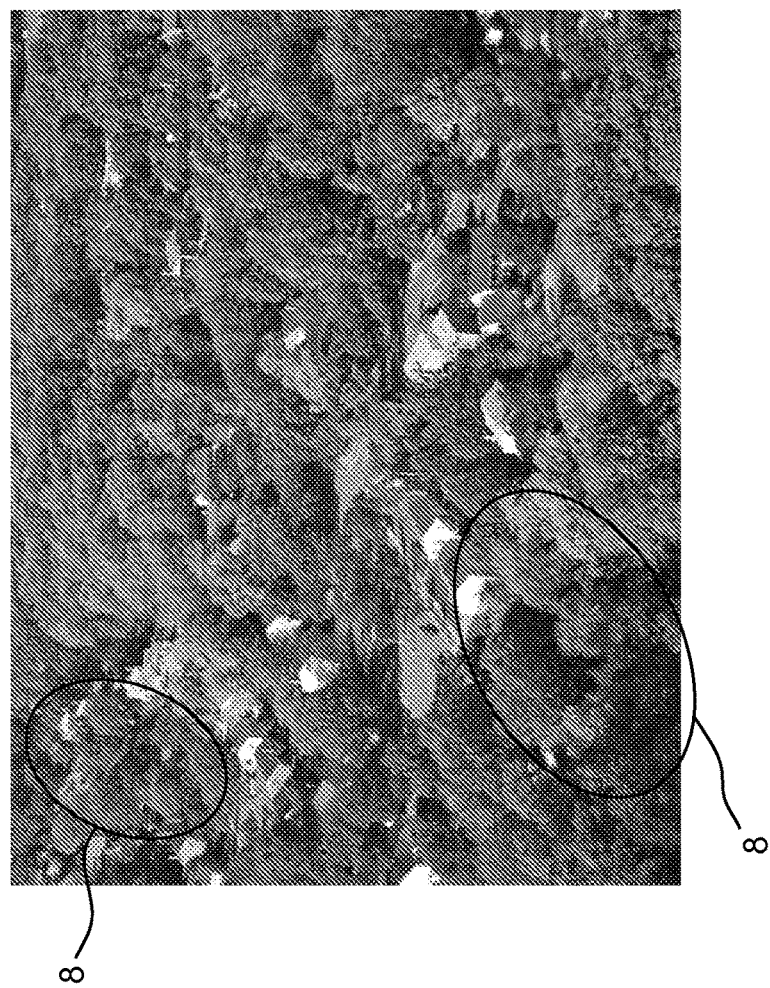
FIG. 5 depicts another exemplary image used to illustrate a UBC according to an embodiment of the invention.

FIGS. 4 and 5 depict exemplary images used to illustrate a UBC according to embodiments of the invention. In FIG. 4, Bradford pear trees are depicted in full bloom during the Spring in the area of Alexandria, Va. The color and texture of the cream-colored pear flowers provides a unique biological signature (i.e., UBC) that may be used to discern, differentiate or distinguish the pear tree species from the other species in the image.

Other examples of a potential UBC for a target plant are: (a) the color and texture of a specific tree's fruit at the time of ripening, as with the red maple fruit; and (b) a specific tree's fall color and texture when chlorophyll is lost (see FIG. 5); and/or (c) the texture associated with leaf emergence. As an example of the last type of UBC maybe illustrated by a natural climax oak forest. The leaves of the tulip popular (*Liriodendron tulipifera*) trees emerge long before the leaves of the oaks, or hickories trees.

Some species, like the red leaves of the Japanese maple (*Acer palmatum* 'Bloodgood'), Crimson King maple (*Acer*

*platanoides* 'Crimson King'), and the Purpleleaf Plum (*Prunus cerasifera*), provide good species specific, color contrast that can be defined in an image. Other leaf colors like the blue spruce (*Picea pungens*) will provide a leaf with a unique color and texture throughout the growing season (see FIG. 6). Other species, such as evergreen trees can easily be distinguished in winter when the deciduous trees have lost their leaves.

These and other unique biological characteristics can be used to determine the location of a specific tree species in an acquired or created image (e.g., aerial image).

Figure 2:
FIG. 2 depicts an exemplary image that may be used as a basis for generating a geo-referenced image according to an embodiment of the present invention.

When a target plant and its associated UBCs are determined, the next step in an exemplary method is to acquire or otherwise create date-specific, geo referenced color and textural images by, for example, using an aerial platform that creates digital, aerial images. Again, this step may be completed before or after other steps that are a part of a particular exemplary method. FIG. 2 depicts an exemplary created or acquired image that may be used as a basis for generating a geo-referenced image according to an embodiment of the present invention.

The timing of the acquisition or creation of the geo-referenced images is tied to the time of year, or other conditions, when the selected UBC (color and/or texture) of a target plant is readily discernible (e.g., visible). For example, assuming a selected UBC is a color that is visible during the Fall, the images should be created during the Fall. Another example may further illustrate the relationship between the creation of an image and the selected UBC(s). Assume that a selected UBC is associated with a color of a target plant during the emergence of a colored flower, or emergence of a colored fruit on a plant. Accordingly, it follows that the images should be created during the time period during which the colored flower or fruit emerges. In the case where archived images may be used, such images should have been created in the past during a time period that is associated with a selected UBC or UBCs.

In accordance with an embodiment of the present invention, each acquired or created image comprises a plurality of subsections referred to commonly as pixels. Thus, an image of a given plant (e.g., flower, fruit, and leaf) is composed of individual pixels. Thus, some of the pixels will contain color content. In accordance with an embodiment of the present invention each pixel or other subsection of an acquired or created image should be geo-referenced. That is, each pixel should be associated with a latitude and longitude (i.e., a GPS location), for example, Accordingly, each colored pixel of an acquired or created image may be associated with a unique location and color (or colors).

In the visible spectrum of light, each colored pixel may comprise a value associated with the red wavelength of light, the green wavelength of light, and the blue wavelength of light. Accordingly, each pixel may be associated with a GPS location. Yet further, a given value (i.e. red, blue and green) of a given pixel may similarly be associated with a GPS location or other location.

Such acquired or created images are typically digital and should provide vivid color(s) and have enough resolution to represent the color of a small plant. The quality of aerial images may be within the visual, multi spectral, or hyper spectral range. The aerial images of a specific area, acquired, created and/or captured on a specific date will be used to identify plant species in accordance with determined UBCs. In an exemplary process, it is desirable that the environmental conditions remain constant through the entire time that aerial images are created (by a photo shoot, for example).

For example, it is desirable that minimal or no clouds or haze be present at the time the image or images are created and/or captured. An exemplary time of day to create and capture images (e.g., exposures) may be near 12:00 noon. This may reduce uneven shading from the sun's angle. However, images captured at any time of day may be acceptable. In an illustrative embodiment the following conditions are desirable during the creation and capturing of an image: (i) the equipment used to create and capture images should be consistent through the entire process of creating and/or capturing am image; (ii) the consistency of the equipment used, like sensor lens variation, should be controlled to reduce any slight bias in the correction; and (iii) images (i.e., aerial imagery) should be visual bands or higher with a resolution of six (6) inches.

In an illustrative embodiment the aerial platform used to support equipment (e.g., photographic equipment) utilized to create and/or capture images is another variable that should be considered. For example, satellites provide a stable platform for photographic equipment. However, satellite equipment may be too expensive to operate for a given scenario/application. Airplanes or fixed-wing aircraft may also provide a stable platform and provide a relatively close distance between the lens of photographic creation and capturing equipment and the ground. Helicopters or rotary-wing aircraft may be less stable, and therefore, may be less desirable for use in creating and/or capturing geo-referenced images.

Sometimes, on a given date an image will provide UBCs for multiple tree species. The image in FIG. 2 depicts such an event. FIG. 2 depicts flowers on the pear and Yoshino cherry trees, flowers on the native red maples, blue needle color on the blue spruce, and red leaves on the Japanese maple.

In accordance with an embodiment of the invention, the next step in an exemplary method is to locate and select a training plant from among the plants within an area to be surveyed that are associated with the target plant. Said another way, in order to analyze an acquired or created image to identify, for example, all of the plants within the area depicted in the image that correspond to a determined target plant (type of plant), its associated characteristics (e.g., all of the healthy plants, or all of the unhealthy plants) and determined UBCs (colors) it is necessary to locate and select one plant that is known to be within the area as a reference. Locating and selecting a training plant may be completed in a number of different ways. In one embodiment of the invention, a plant may be located by physically travelling within the area until a first plant belonging to the group of plants within the target plant is located. Upon locating the first plant, its characteristics are measured in order to determine if they meet the desired characteristics of an acceptable, determined target plant.

For example, if the first plant is a healthy plant and the characteristics of the target plant require a healthy plant, then the first plant may be accepted as a training plant. However, if the first plant is unhealthy, then it may be rejected as an acceptable training plant. Many characteristics may be associated with a target plant, and, therefore, may be used to select a training plant. In the case where the first plant is rejected, an exemplary method may then involve locating a next plant and, once again, determining if the next located plant meets the characteristics associated with the target plant. In one embodiment of the invention, the just described process may be repeated until a plant, of the target plant type, is located and meets the desired characteristics of the target plaint.

Figure 6:
FIGS. 6 and 7 depict images of an area within which an exemplary training plant may be located and selected according to an embodiment of the present invention.
Figure 7:

Referring now to FIGS. 6 and 7 there is depicted an image of an area within which an exemplary training plant maybe located and selected according to an embodiment of the present invention.

In more detail, in accordance with an embodiment of the invention, to locate a training plant a physical example of the training plant must be located. Two of the most common ways to locate a specific plant in an urban area is a window shield survey and a street tree inventory. A window shield survey consists of slowly driving down a street within the survey area and identifying plant species by traditional horticultural methods (see FIG. 8, for example). A street tree inventory an inventory or listing of trees, by location (e.g., by street) within a community that has been created and maintained by those involved in a municipal forestry program. A street tree inventory is maintained for the management of the trees on public property.

In the case of a window shield survey, such a process may include the following steps: (1) locate the area to be surveyed and a neighborhood where a plant within the group of target plants is likely to be found; and (2) upon locating an acceptable training plant, the address and the physical location are documented; (3); and (4) the address and physical location may be stored in a training database In accordance with an embodiment of the invention, upon locating and selecting an acceptable training plant, the plant may then be related to a geo-referenced image (e.g., aerial image) of the survey area to, for example, identify all other plants within the area that have the same characteristics of the training plant, and are of the same target plant type.

In accordance with an embodiment of the invention, when a plant has been located on a geo-referenced image, it will, in all probability, remain at the same GPS. location throughout its lifetime. If the plant is a perennial, the location of that plant is relatable to other geo-referenced images. Images captured during any year of the plant's life will be relatable. The size and condition of the plant may vary over time, but the location will not.

In a specific example, the training plant (i.e., its digital representation) may be located on a date specific, geo-referenced aerial image. Thereafter, parcel and street centerline layers may be overlaid on the image. Zooming down to the 1:3000 scale, for example, of the neighborhood where the acceptable training plant is located. After the neighborhood has been located in the image of the survey area, zoom in on the street. Relate the aerial to the vector file of the parcel. Locate the individual plant on the property. Zoom down to the parcel where the plant lives.

Figure 8:
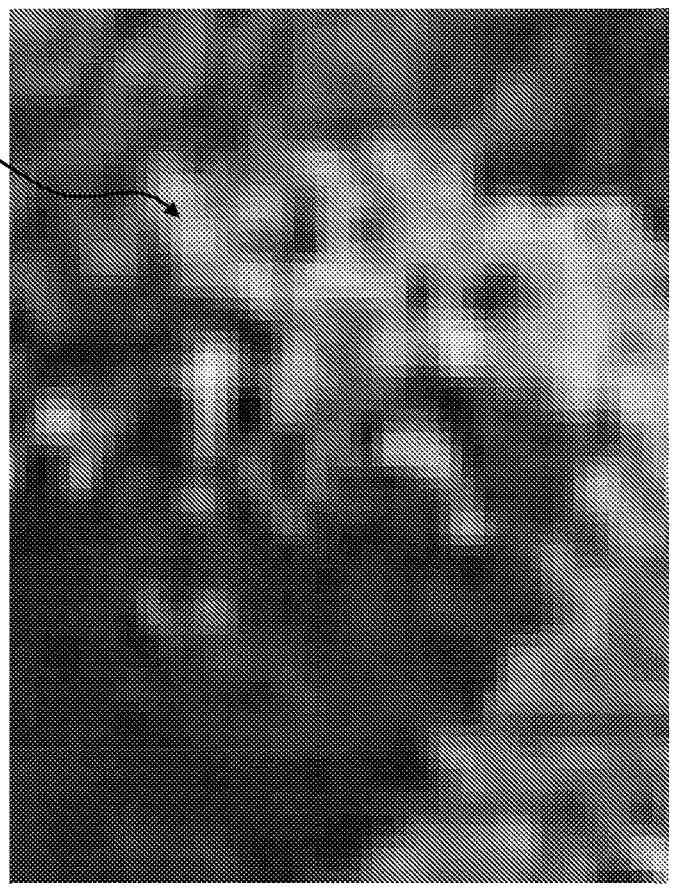
FIG. 8 depicts an exemplary image of a located training plant according to an embodiment of the present invention.
Figure 9:
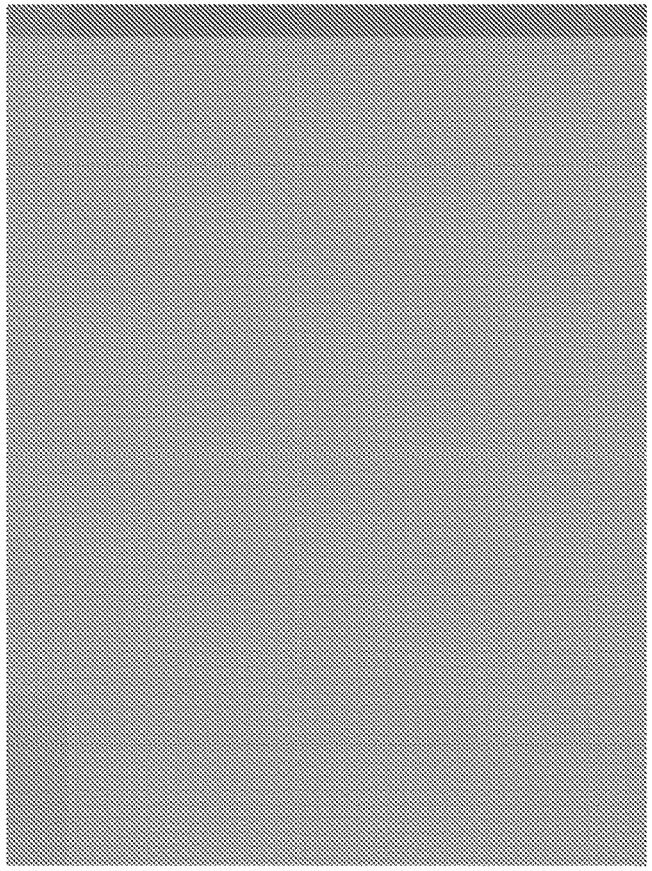
FIG. 9 depicts a section (e.g., a pixel) of an image of an exemplary training plant associated with a UBC of the plant according to an embodiment of the invention.
Figure 10:
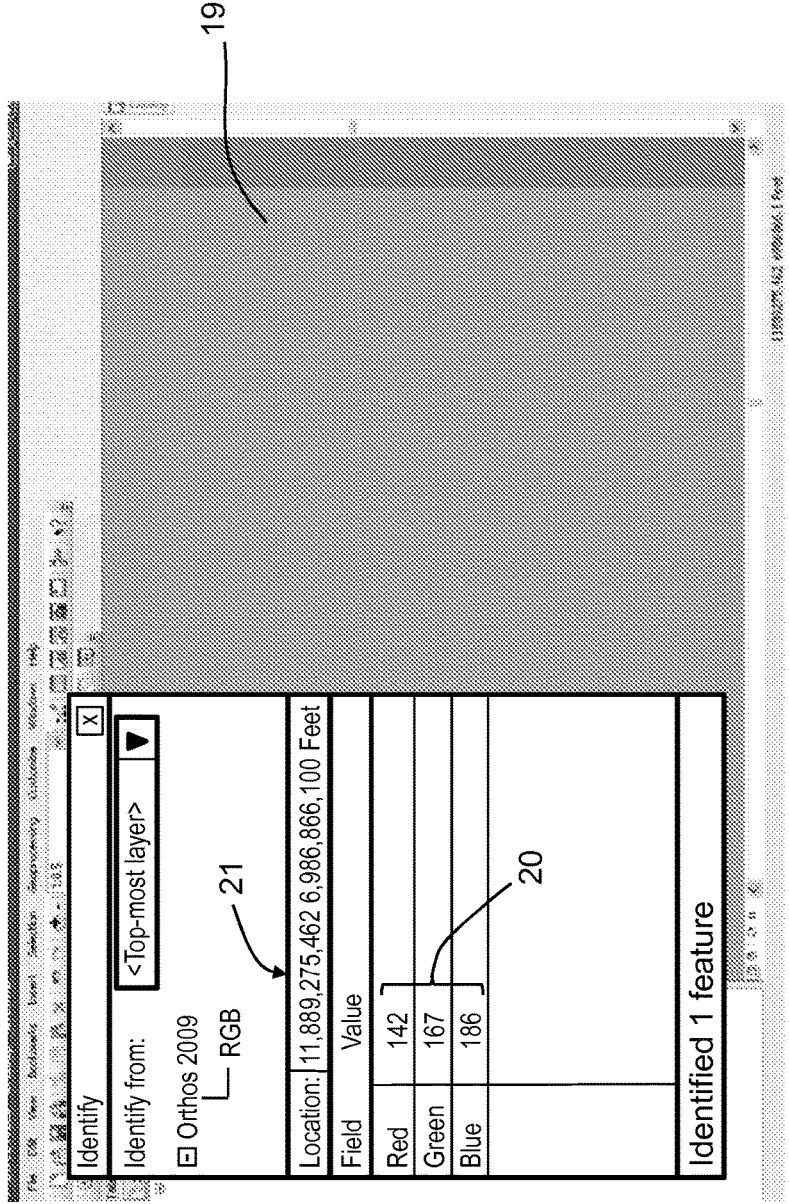
FIG. 10 depicts an exemplary representation of values associated with UBCs according to an embodiment of the invention.

FIGS. 8 through 10 depict an image illustrating the display of the value of a UBC of a pixel on a 1:0.5 scale, for example. At this scale, the UBC pixels are distinguishable from the background of the image. Select a pixel with the color that best represents that of the UBC. Separate the UBC from the background; the pixel that represents the color of the UBC can be visibly identified in the pixilated image. Zoom in on the UBC pixels in the image. (see FIG. 12)

To identify the pixel values of the UBC, zoom down to the 1:0.5 scale. At this scale, the UBC pixels are distinguishable from the background of the image. Select a pixel with the color that best represents that of the UBC. This will be the individual pixel of the UBC. (see FIG. 13). Make sure the aerial image is the only thing active in the screen. To evaluate GPS data requires a software program like ArcGIS program by ESRI. This example will use the ArcGIS program. Activate the "information" button on the (Arc View Arc GIS) tool bar. This will provide the visible color values of the red wavelength, green wavelength, and the blue wavelength, as well as the geo-reference location of the pixel. (see FIG. 14).

Repeat the process on all four geography sides and top of the plant if possible. Download a system that can integrate geographic information system (GIS) data. Download municipal data of the target area. Working within a special management software like the commercial product Arc Map Arc GIS, load the vector or shape files and the aerial images. The most important vector file will be the parcel file. This file contains information on the parcel of land, the owner/resident contact information, and the hardscape on the parcel. The second most important file will be the street file. This file contains information on the street name and property boundaries. Identify the UBC of the target plant. This may be the flower, fruit and/or foliage that provides the unique color of the UBC. For a simple example, the foliage of the blue spruce will be the UBC.

Figure 11:
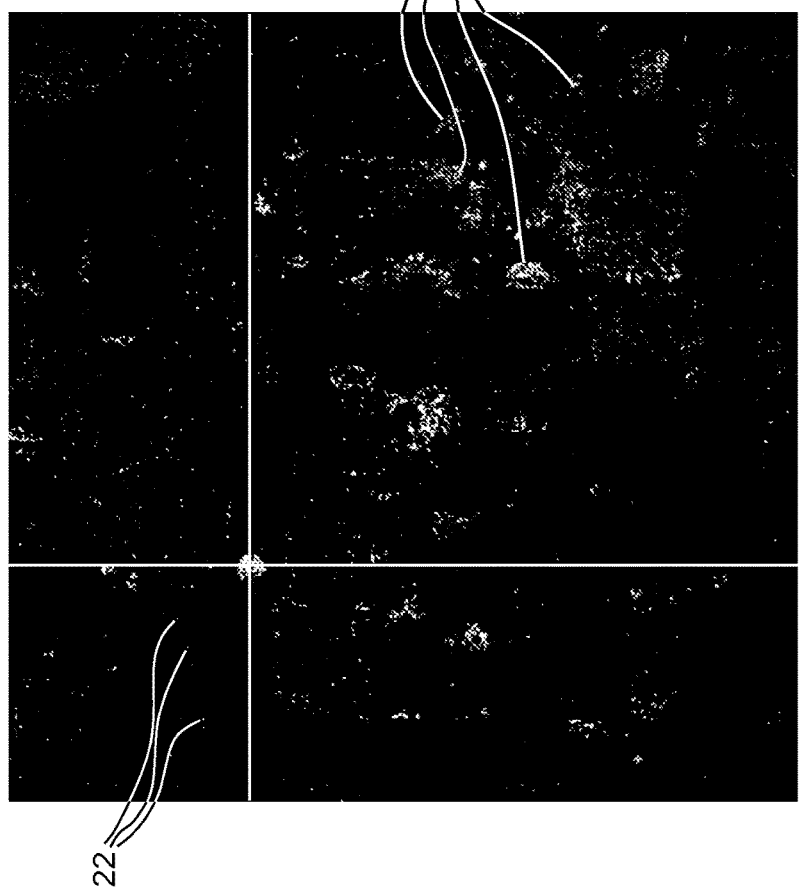
FIG. 11 depicts an exemplary image used to identify image sections (e.g., pixels) associated with representative values that are further associated with UBCs of a training plant according to an embodiment of the invention.

FIG. 11 depicts an example of the results from a digital search. Each of the white dots are a pixel in the search area with a similar red-blue-green (rbg) value. This is how to locate the target plant by searching for pixels that match those of the training plant. The first step to searching for a target plant with a training plant is to search the data base for all pixels with similar rgb values as the training plant. Description of a digital search engine: The digital search engine will evaluate each pixel's rgb value in the image to find similar rgb combinations. This example will use the Environment for Visualizing Images (ENVI) by Exelis. ENVI will manage the "workflow" of this supervised classification.

In accordance with the present invention a set of instructions stored in a memory or other computer readable device may be accessed by a processor and executed to complete a program applied to the image. One function (sometimes referred to as a "tool") allows for the management of workflow for a supervised classification.

Further instructions may be accessed and executed to provide a set criteria for searching in (ENVI toolbox. other methods are available to search each pixel in the aerial image data base) Arc Map Shape File/Training UBC 1 values vector layers. The results of the search may be produced in a raster format. The raster file may then converted into a vector file. The new vector files/layer may be projected over the image of the surveyed area.

One set of criteria is a supervised classification of the pixels in the image.

One way to find the target plant in an image is to running a supervised classification of the (rgb) for the UBC. Run a supervised classification on the average rgb in "Training UBC 1 values/rgb." (i.e, the name of an output database). The results may be a data set of all pixels with similar rbg values. Thereafter, the program may search each pixel for the spectral radiance as the UBC.

Another process that may be used is band math and/or other methodology to separate the UBC (color of blue spruce leaf) from the aerial image.

The final results likely contain blue spruce pixels and a lot of noise some noise or false-positives.

Once probable UBC pixels are located, the corresponding GPS points maybe stored in a database as a shape file or vector layer (see FIG. 15), where the database may be stored on one or more hardware memories. It should be noted that each database referred to herein, may be stored on an associated memory or memories. Further each reference, explicit or implicit, to the manipulation or storage of an image or data may involve a hardware memory that stores such an image or data and one or more associated processors operable to access and execute instruction stored within program memory to manipulate or store such an image or data.

Figure 12:
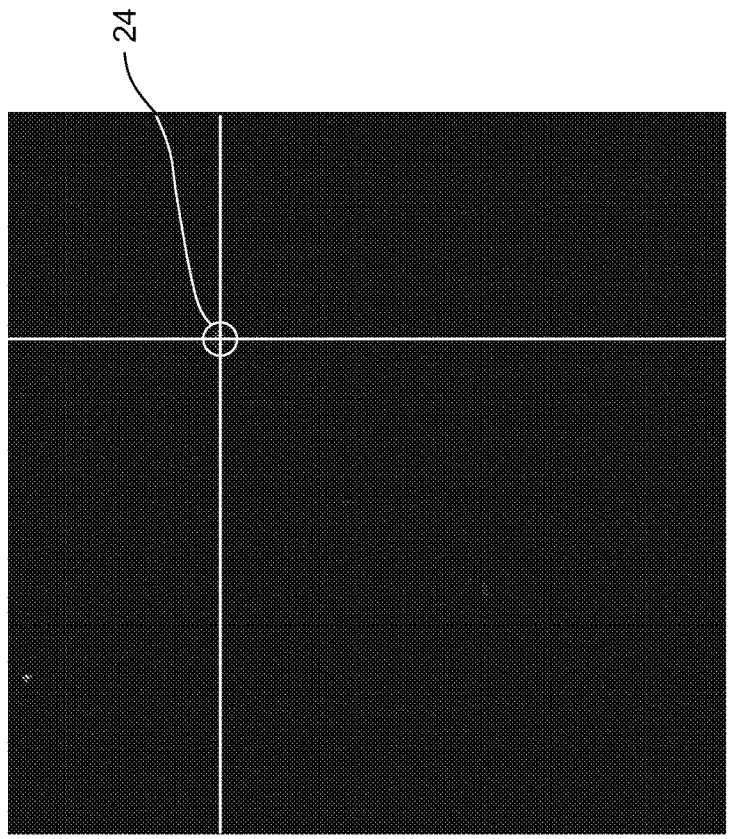
FIG. 12 depicts exemplary, identified image sections (e.g., pixels) associated with representative values that are further associated with UBCs of a training plant according to an embodiment of the invention.

In another example, a supervised classification of the aerial image maybe used to find other UBC in the data. The results of the supervised classification are a large organized collection of GPS locations to be converted to a vector file. One method to clean up the noise or false-positives in the data involves an exemplary three (3)-step process:

FIG. 12 depicts the identification of the clusters of the results of the algorithm's digital search. The cluster review consolidates multiple results from the search. The clusters are likely to be larger plants. In this example search for trees. So, the cluster review is a sequential, accumulation of the results of the supervised classification over the aerial image of the community. The reviewer will save the results into a file according to the GPS location. The cluster of points will be organized in to a file so the results can be viewed sequentially.

Figure 13:
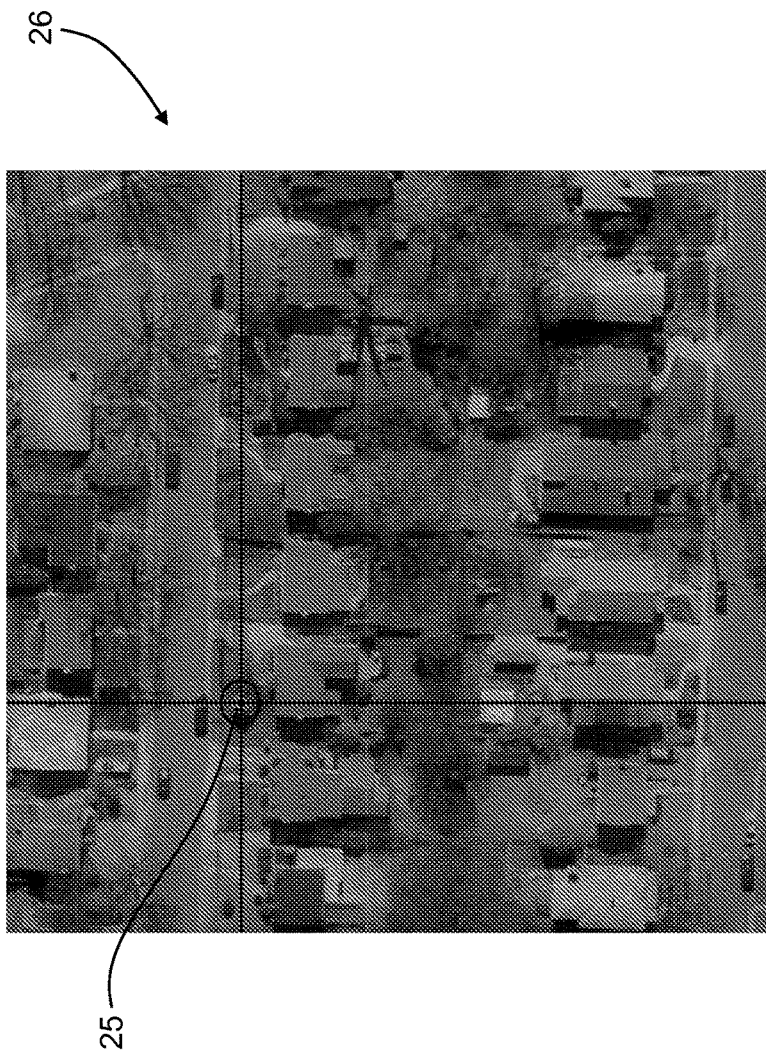
FIG. 13 depicts an exemplary, generated display of identified image sections associated with representative values that are further associated with UBCs of a training plant overlaid on an exemplary image of a physical area being surveyed.

FIG. 13 depicts an example of a display of results of a cluster review over the aerial image. The object review is a visual review of the clusters over the aerial image to exclude look-alikes/noise/false-positives from the data. The pixels in the search results are all geo-referenced. so they will project in the identical location as the object that has the same rbg/color as the training plant. View each cluster over the physical object sequentially. Classify each cluster into categories from the most likely to be correct result or incorrect result; i.e. a blue spruce or not a blue spruce. The color of the UBC is distinctive, but not necessarily unique in the natural world. Separate the incorrect results into other similarly colored objects that can be identified from the aerial image "look-alike" such as a car with paint color similar to the color of the UBC of the blue spruce leaf. Separate the other similarly colored objects that cannot be explained by the aerial image "questionable results" into a file to be reviewed in the field.

Figure 14:
FIG. 14 depicts an exemplary image used to illustrating a method for verifying the results of a UBC identification method according to an embodiment of the invention.

FIG. 14 depicts an example of object reviews that were reviewed in the field. Prepare for Field Review: Determine one percent of survey points to be reviewed in the field. When selecting a survey site, try to choose locations that can be observed from public property. If the site requires entrance onto a private property, permission will be required prior to the visit. Save private property surveys in a database and vector file.

The preparation for the survey site involves logistical considerations, such as: (i) the digital data to review, (ii) communication tools between the citizens and the operation; (iii) equipment (iv) legal authorization to operate.

Save a digital image of the individual survey plant associated with the GPS position that can be evaluated at the pixel level in the field.

Develop an interactive web site for operational communications between owners/residents and the survey team.

Assemble the transportation, field hardware, and software to operate from the survey site. Develop a routed map for the survey sites.

Contact the property owner/resident if needing access to private property.

The property owners from a training/UBC property information database. Any plant that can't be reviewed from public property, you must contact the owner for permission.

Contact the municipality where that the surveys are being performed.

The next part of locating the target plant is a field review of the spectral radiance of the UBC. The field review may be developed through the following process: (a) confirm physical variables; (b) quantify the spectral radiance of the UBC; and (c) quantify the quality of the UBC.

The results of the field survey will be a data set for the spectral response pattern of the target plant. The spectral response pattern is quantitative, but not absolute in the natural world. Set a goal of 90% accuracy or better.

The statistics used in the training plant data set must be representative. The field review shall first confirm the data used to make up the survey site is accurate.

Confirm why look-alikes were excluded from the survey points. Locate look-alikes in the vicinity of the UBC survey site. Review any questionable look-alikes on the way to the UBC survey site.

Confirm no UBC were missed. From the vicinity of the UBC survey site, the surveyor shall search for unidentified UBC while in the field performing the reviews. The supervised classification is limited to UBC that are exposed and have sufficient light to highlight the characteristic. Plants growing under the canopy of other plants or in the shadow of building may not be exposed.

Perform a window shield survey while moving from one survey point to the next. Quantify the spectral radiance of the UBC. The digital data set that distinguishes the training plant must be complete. The UBC digital data set is based solely on the spectral radiance observed in the pixel that represents the spectral signature of the UBC of the plant that is to be identified. The surveyor may evaluate 5 pixels of each plant: the geo-graphic locations (north, south, east, west) and the top of the plant.

Those pixels shall be based solely on the red, blue, and green (rbg) wavelength values that represents the spectral signature of the UBC.

Evaluate the color of the UBC pixel by pixel on a tablet at the field site of the plant being reviewed. (See Excel spreadsheet)

Quantify the quality of the UBC. The spectral radiance of UBC must be representative of all of the training plant's digital dataset statistics throughout the urban forest to be surveyed. The color and texture of the UBC for the training plants' digital data set should reflect the quality of the UBC throughout the urban forest to be surveyed.

The physical pigments of the UBC are relevant to the visible portion of the color spectrum of light. The color of the UBC is affected by the chlorophyll, nutrient availability, and moisture present in the cell at the time of the image is recorded. The pigments of the flowers, fruit, and foliage can be suppressed and stunted on a stressed plant. So, the training plant should also represent those aspects of the species to be complete.

Three conditions to search for in representative plants are browning in unique biological characteristic, yellowing in unique biological characteristic, and dullness of UBC.

Browning on the UBC may be caused by dead margins. The combination of browning margins presents a unique pixel color for the UBC. That unique color shall be documented as an extreme UBC in the digital dataset. Yellowing on the UBC may be caused by a decrease of chlorophyll, or nutrient deficiency. The combination of yellowing presents a unique pixel color for the UBC. That unique color shall be documented as an extreme UBC in the digital dataset. Dullness on the UBC may be caused by a lack of moisture, decrease of chlorophyll, or nutrient deficiency. The combination of dullness presents a unique pixel color for the UBC. That unique color shall be documented as an extreme UBC in the digital dataset. Other abnormalities from the size of the leaf and the shape of the canopy should be documented.

These defective parts should be considered to make up the training plant data set.

The training plant should reflect the shape of the canopy of the plant. The shape of the training plant's canopy is important for many reasons. Some physical aspects of a multiple trunked shade tree might be misinterpreted as many trees. These variables should be identified in the field review and added to the digital dataset of the training plant. The shape of the training plant's canopy is important for many reasons. The canopy of the training plant is identified by the cluster of pixels.

The Refinement Process: In an embodiment a goal may be to achieve 90% accuracy or greater plant identification. If the results of the object and field reviews plant identification appears to reach the goal, review additional information.

Incorporate other known data like existing tree inventories. The inventory will define the tree species, its address, and its location. That "know data" can also be used to determine a survey point location. The questions that were answered or created during the field review should be incorporated into the formula of the supervised classification and the reviews.

The refinement process may require going back and increasing the UBC collected for an individual species. If the results are not conclusive, adding another UBC may clarify the species. For example: if the blue spruce leaf is not a conclusive indicator of the blue spruce trees, the additional UBC of fall color may be added to the fruit color. The combination of the two UBCs may provide a better spectral response pattern for the blue spruce tree.

Figure 15:
FIG. 15 depicts an exemplary survey area according to an embodiment of the invention.

FIG. 15 shows the search area where one of the two (2) steps of quality control will be administered. Quality Control: This is the quality control process of the identification of plant species by UBC. After the geo-referenced UBC classifications are saved in the database and vector file, they are ready to test for accuracy. The quality control is preformed in a three (3) step process; the User Based Classification, the Relational Based Classification and the Validation. The user base classification (1) is a more robust evaluation of all of the search results that have a high likelihood of being the target plant. It involves testing as close to 100% of the search results as possible. The percent return will be directly related to the quality of interaction and communication with the public. Capture the digital image of the individual plant that was identified in the object review, but did not qualify for the field review. Incorporate that image into a tri-fold brochure that can be mailed to the owner/resident. The tri-fold mailer should contain enough information to support the resident becoming involved with the plant identification process. Acquire local municipal data for the streets, address, property lines, and owners etc. Coordinate geo-reference point with civic address. Document the name and address of the property owner/resident. This is the same process as developing the field survey locations. Get support from the civic associate. Coordinate geo-reference point with civic address. Develop an on-line, interactive database for owners/residents to interact with. This on-line interaction will be an opportunity to develop ownership of the individual plant by the public. This ownership will be necessary for future interaction with the tree. Develop a password system so owner/residents can access the database. Develop links to universities with plant identification training supports. Make those plant identification training supports available to the owner/residents. The on-line website should contain information to identify plants by standard horticultural methods. The identification description should incorporate links to academic web-sites developed for the identification of plants. Develop a process to report the results of the owner/resident survey into one of three results; accurate identification, inaccurate identification, or need more information. Mail the picture of the Object Reviews to the owner/residents of the property. Ask them to go to the (interactive) on-line database and confirm or deny the accuracy of the supervised classification. Answer all of the "need more information" results from the on-line survey of the owner/resident. Field test all of the "need more information" results from the on-line survey of the owner/resident if needed. That "know data" can also be used to determine a survey point location. The questions that were answered or created during the field review should be incorporated into the formula of the supervised classification and the reviews. Use this evaluation to refine the field review. Make adjustments to the individual color and texture to correct any problems that degrade the quality of the plant survey results. The database should be a complete representation of the quantity and location of the plant species in the survey.

Figure 16:
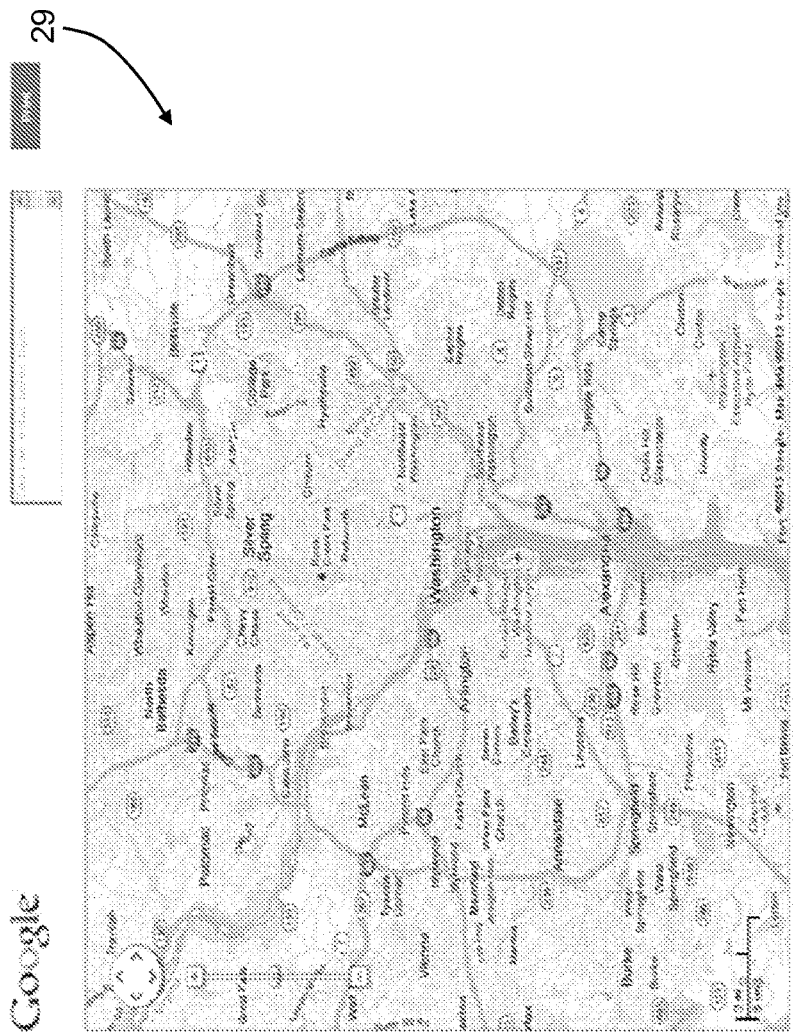
FIG. 16 depicts areas surrounding an exemplary, sample survey area according to an embodiment of the invention.

FIG. 16 shows the neighboring communities where quality control testing might occur. The relational based classification (2) is the second part of the quality control process. This process involves testing the process in closely related communities. Locate a neighboring municipality that is near the same elevation to sea level as the municipality tested above. Coordinate with environmental managers in neighboring municipality. Ask that municipality for support with plant identification. The neighboring municipality should have date specific aerial images that were captured by the same equipment at the same time as the images used in the process above. The neighboring municipality should have parcel vector file with the owner/residents contact information. Ideally, the neighboring municipality can provide support for the reviews and testing. Request support from field crews that will be able to perform the object review and the field review. Request support with printing and mailing of the tri-fold brochure to the owner/resident. Answer all of the "need more information" results from the on-line survey of the neighboring municipalities owner/resident. Field test all of the "need more information" results from the on-line survey of the owner/resident if needed. That "know data" can also be used to determine a survey point location. The questions that were answered or created during the field review should be incorporated into the formula of the supervised classification and the reviews. Make adjustments to the individual color and texture to correct any problems that degrade the quality of the plant survey results. The database should be a complete representation of the quantity and location of the plant species in the survey. Validation: The validation process is to add to the robustness of the plant identification data. This process tests the data against other know data. If the plant is a perennial it may be identifiable in older year images of the same location. Look at multiple year images of the City of Alexandria. The cluster, GPS locations should be relatable to the clusters identified above. They may be smaller clusters, but the location should be the same. Add the results to a plant library. With adjustments for the phonology of the plant; the data should be applicable to perform the same process anywhere in the world. When validation is complete, adjustments may be made for other communities.

It should be understood that the features, methods and functions described herein may be implemented using a system that comprises one or more hardware components.

The hardware components may be designed to complete the features, methods and functions of the present invention. For example, the functions of acquiring, creating and/or capturing images (e.g., aerial images) described herein may be completed one or more hardware components comprising a imaging platform. The platform may further comprise one or more processors operable to access and execute instructions stored in one or more hardware program memories to control an imaging device that is used to acquire, create and/or capture images. The images may be stored in an imaging memory (database) as pixels or the like for later access and comparison to data associated with a training plant.

Yet further, a date-specific, geo-referenced hardware platform may be provided to associate a specific date and geo-reference to each subsection (pixel) of an image. Such a platform may comprise one or more processors operable to access and execute instructions stored in one or program memories to associate a specific date and geo-reference to each subsection (pixel) of an image.

Data representing a "target" plant (i.e., plant type) and associated target plant characteristics may be stored in a target plant, hardware memory device, such as a database or computer memory. One or more target plant processors, that includes a user interface (e.g., hardware display, keyboard, and associated stored program instructions) may be used to access the data associated with a target plant stored in the target plant, hardware memory device in order to low a user to view, analyze and select a target plant and its associated characteristics.

One or more UBC memories may store UBC data that is associated with a determined target plant. An associated processor or processors operable to execute instructions stored in program memory may be further operable to access the UBC data. A separate user interface, or the same interface described above, may be included to allow a user to access the stored UBC data in order to facilitate a determination of one or more UBCs associated with a target plant (e.g., color and/or texture).

Similarly, each of the functions and features related to the processes of: (i) evaluating of each located plant as a potential "training" plant based on a desired, target plant; (7) testing results by cluster, object, and field reviews; and (8) applying quality control through user and relational based classification, and validation may be completed by associated memory, processors, and a user interface that are designed to complete the necessary features and functions required to implement such processes.

Though the present invention has been described with reference to exemplary embodiments it should be understood that variations may be made to such embodiments without departing from the spirit or scope of the present invention which is set forth in the claims that follow.

What is claimed is:

1. A method for remotely identifying tree species within a genera by unique biological characteristics (UBC) comprising:
storing a training tree data set comprising RGB value data representative of emerging foliage, UBC characteristic data of a training tree species within a genera on an imaging platform;
acquiring an image of a physical area that comprises color information of emerging trees within the image using the imaging platform, wherein the imaging platform comprises a camera;
identifying a tree from among the emerging trees within the acquired image of the physical area that exhibits the stored RGB data and representative foliage UBC characteristic data of the training tree species within the genera using the imaging platform; and
comparing pixels of the identified tree within the acquired image with additional pixels within the acquired image to identify additional emerging trees that are associated with at the foliage UBC data of the training tree species within the genera using the imaging platform.

2. The method as in claim 1 further comprising creating a date-specific, geo referenced image from the acquired image using the imaging platform.

3. The method as in claim 1 wherein the imaging platform comprises an aerial platform.

4. The method as in claim 1 wherein the stored UBC characteristic data further comprises data related to date or time period dependent UBCs, the method further comprising comparing pixels of the identified tree within the acquired image with additional pixels within the acquired image to identify additional pixels that represent additional trees within the acquired image that are associated with at least the date or time period dependent UBC of the training tree species within the genera using the imaging platform.

5. The method as in claim 1 wherein the stored UBC characteristic data further comprises data related to color and texture of a fruit associated with ripening of the fruit, the method further comprising comparing pixels of the identified tree within the acquired image with additional pixels within the acquired image to identify pixels that represent additional trees within the acquired image that are associated with the color and texture of a ripening fruit using the imaging platform, wherein the fruit is associated with the training tree species within the genera.

6. The method as in claim 1 wherein the UBC characteristic data further comprises data related to color and texture of a leaf associated with a loss of chlorophyll, the method further comprising comparing pixels of the identified tree within the acquired image with additional pixels of the image to identify pixels that represent additional trees within the acquired image that are associated with the color and texture of a leaf associated with a loss of chlorophyll using the imaging platform, wherein the leaf is associated with the training tree species within the genera.

7. The method as in claim 2 further comprising associating one or more pixels of the acquired image with a geo-reference position using the imaging platform.

8. The method as in claim 7 wherein the geo-reference position comprises a latitude and longitude.

9. The method as in claim 1 wherein the method further comprises storing the results of the comparison.

10. The method as in claim 1 further comprising:
identifying clusters of information within the acquired image that exhibits one or more of the UBCs; and
classifying the identified clusters into those that are associated with the training tree species, and those that are not identified with the training tree species within the genera.

11. The method as in claim 10 further comprising viewing one or more of the identified clusters over a position in the acquired image.

12. The method as in claim 1 further comprising:
storing the training tree data set comprising RGB value data representative of emerging foliage and flower, UBC characteristic data of the training tree species within a genera on the imaging platform;
identifying a tree from among the emerging trees within the acquired image of the physical area that exhibits the stored RGB data and representative foliage and flower UBC characteristic data of the training tree species within the genera using the imaging platform; and comparing pixels of the identified tree within the acquired image that exhibits the stored RGB data and representative foliage and flower UBC characteristic data with additional pixels within the acquired image to identify additional emerging trees that are associated with at the foliage and flower UBC data of the training tree species within the genera using the imaging platform.

13. The method as in claim 12 further comprising:

storing the training tree data set comprising RGB value data representative of emerging foliage, flower and fruit, UBC characteristic data of the training tree species within a genera on the imaging platform;

identifying a tree from among the emerging trees within the acquired image of the physical area that exhibits the stored RGB data and representative foliage, flower and fruit UBC characteristic data of the training tree species within the genera using the imaging platform; and comparing pixels of the identified tree within the acquired image that exhibits the stored RGB data and representative foliage, flower and fruit UBC characteristic data with additional pixels within the acquired image to identify additional emerging trees that are associated with the foliage, flower and fruit UBC data of the training tree species within the genera using the imaging platform.

14. A method for remotely identifying tree species within a genera by unique biological characteristics (UBC) comprising:

storing a training tree data set comprising RGB value data representative of emerging flower, UBC characteristic data of a training tree species within a genera on an imaging platform;

acquiring an image of a physical area that comprises color information of emerging trees within the image using the imaging platform, wherein the imaging platform comprises a camera;

identifying a tree from among the emerging trees within the acquired image of the physical area that exhibits the stored RGB data and representative flower UBC characteristic data of the training tree species within the genera using the imaging platform; and comparing pixels of the identified tree within the acquired image with additional pixels within the acquired image to identify additional emerging trees that are associated with at the flower UBC data of the training tree species within the genera using the imaging platform.

15. The method as in claim 14 further comprising:

storing the training tree data set comprising RGB value data representative of emerging flower and fruit, UBC characteristic data of the training tree species within a genera on the imaging platform;

identifying a tree from among the emerging trees within the acquired image of the physical area that exhibits the stored RGB data and representative flower and fruit UBC characteristic data of the training tree species within the genera using the imaging platform; and comparing pixels of the identified tree within the acquired image that exhibits the stored RGB data and representative flower and fruit UBC characteristic data with additional pixels within the acquired image to identify additional emerging trees that are associated with the flower and fruit UBC data of the training tree species within the genera using the imaging platform.

16. A method for remotely identifying tree species within a genera by unique biological characteristics (UBC) comprising:

storing a training tree data set comprising RGB value data representative of emerging fruit, UBC characteristic data of a training tree species within a genera on an imaging platform;

acquiring an image of a physical area that comprises color information of emerging trees within the image using the imaging platform, wherein the imaging platform comprises a camera;

identifying a tree from among the emerging trees within the acquired image of the physical area that exhibits the stored RGB data and representative fruit UBC characteristic data of the training tree species within the genera using the imaging platform; and comparing pixels of the identified tree within the acquired image with additional pixels within the acquired image to identify additional emerging trees that are associated with at the fruit UBC data of the training tree species within the genera using the imaging platform.

* * * * *